(12) United States Patent
Li (10) Patent No.: US 12,317,110 B2
(45) Date of Patent: May 27, 2025

(54) CHANNEL MEASUREMENT METHOD AND APPARATUS, AND COMMUNICATION DEVICE

(71) Applicant: Beijing Xiaomi Mobile Software Co., Ltd., Beijing (CN)

(72) Inventor: Yuanyuan Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 435 days.

(21) Appl. No.: 17/884,401

(22) Filed: Aug. 9, 2022

(65) Prior Publication Data

US 2022/0386157 A1 Dec. 1, 2022

Related U.S. Application Data (63) Continuation of application No. PCT/CN2020/074657, filed on Feb. 10, 2020.

(51) Int. Cl.
*H04W 24/08* (2009.01)
*H04W 72/23* (2023.01)

(52) U.S. Cl.
CPC .......... *H04W 24/08* (2013.01); *H04W 72/23* (2023.01)

(58) Field of Classification Search
CPC ..... H04W 24/08; H04W 72/23; H04B 17/309
See application file for complete search history.

(56) References Cited

U.S. PATENT DOCUMENTS

| 2018/0295600 | A1* | 10/2018 | Kumar ............... H04L 5/0051 |
| 2018/0376394 | A1 | 12/2018 | Hahn et al. |
| 2019/0059093 | A1* | 2/2019 | Cheng ............... H04L 5/0082 |
| 2019/0319748 | A1 | 10/2019 | Wooseok et al. |
| 2020/0178194 | A1* | 6/2020 | Li ............... H04W 36/0088 |

FOREIGN PATENT DOCUMENTS

| CN | 101959210 A | 1/2011 |
| CN | 104602267 A | 5/2015 |
| CN | 106559826 A | 4/2017 |
| CN | 108024364 A | 5/2018 |
| CN | 109644076 A | 4/2019 |
| CN | 110062413 A | 7/2019 |
| CN | 110392386 A | * 10/2019 | ............ H04W 24/08 |
| WO | WO 2016/119326 A1 | 8/2016 |
| WO | WO 2017/075918 A1 | 5/2017 |

OTHER PUBLICATIONS

ISA State Intellectual Property Office of the People's Republic of China, International Search Report Issued in Application No. PCT/CN2020/074657, Nov. 6, 2020, WIPO, 4 pages.

(Continued)

*Primary Examiner* — Chae S Lee
(74) *Attorney, Agent, or Firm* — Oblon, McClelland, Maier & Neustadt, L.L.P.

(57) ABSTRACT

Aspects of the disclosure relate to a channel measurement method and apparatus, and a communication device. Inter-frequency signal measurement can be performed during a temporary measurement gap, where the temporary measurement gap is different from a periodic measurement gap used for inter-frequency signal measurement.

17 Claims, 4 Drawing Sheets

(56) References Cited

OTHER PUBLICATIONS

Intel Corporation, "On intra-frequency measurement with gap or interruption", 3GPP TSG-RAN4 Meeting #AH1801 San Diego, CA, US, Jan. 22-26, 2018, R4-1800138, 5 pages.
Written Opinion of the International Searching Authority Issued Nov. 6, 2020, in PCT/CN2020/074657, (with English Translation), 9 pages.
Combined Chinese Office Action and Search Report issued Dec. 28, 2023, in corresponding Chinese Patent Application No. 2020800002388 (with English Translation and English Translation of Category of Cited Documents), 11 pages.
Nokia, Nokia Shanghai Bell, "RRM part of BWP switching", 3GPP TSG-RAN WG4 Meeting AH-1807, R4-1809179, Montreal, Canada, Jul. 2-6, 2018, 8 pages.
NTT Docomo, Inc., "Way forward on UE behavior during measurement outside measurement gap", R4-1800566, 3GPP TSG-RAN WG4 NR-AH#4, San Diego, US, Jan. 22-26, 2018, 11 pages.

\* cited by examiner

CHANNEL MEASUREMENT METHOD AND APPARATUS, AND COMMUNICATION DEVICE

CROSS REFERENCE TO RELATED APPLICATIONS

The present application is a continuation of International Application No. PCT/CN2020/074657, filed on Feb. 10, 2020, all of which is incorporated herein by reference in its entirety.

BACKGROUND OF THE INVENTION

Field of the Invention

The present application relates to the field of wireless communication technology but is not limited to the field of wireless communication technology, and in particular relates to channel measurement methods and apparatuses, and communication devices.

Description of the Related Art

In the $5^{th}$ Generation (5G) cellular mobile communication technology, e.g., a New Radio (NR) system, a User Equipment (UE) is expected to periodically measure a reference signal from at least one neighbor cell for performing mobility measurement. In a case that a bandwidth of the UE's receiver is not sufficient to cover both frequencies of a serving cell and the neighbor cell, the UE can perform measurement on the neighbor cell at a regular interval, and a base station can configure a measurement gap for inter-frequency signal measurement for the UE. For example, a measurement gap periodicity may be 40 ms, each measurement gap may last 6 ms, an offset configured for the measurement gap may be 20 ms, and then 20-25 ms, 60-65 ms and 100-105 ms are measurement gaps. A neighbor cell can be an inter-frequency cell.

For an inter-frequency cell, the UE can also listen to a Synchronization Signal Block (SSB) from the inter-frequency cell. The base station can set SSB Measurement Timing Configuration (SMTC) for the UE. A configuration content of the SMTC includes a listening periodicity, an offset, a duration, and an IDentity (ID) of a cell whose SSB is listened. For example, the listening periodicity may be 80 ms, the offset may be 40 ms and the duration may be 5 ms, and then the UE can listen to the SSB of a neighbor cell during 40-44 ms, 120-124 ms, 200-204 ms and the like.

SUMMARY OF THE INVENTION

In view of above, examples of the present disclosure provide a channel measurement method and apparatus, and a communication device.

According to a first aspect of examples of the present disclosure, there is provided a channel measurement method, being applicable to a user equipment. The method includes:

performing inter-frequency signal measurement during a temporary measurement gap, where the temporary measurement gap is different from a periodic measurement gap used for the inter-frequency signal measurement.

According to a second aspect of examples of the present disclosure, there is provided a channel measurement method, being applicable to a base station. The method can include transmitting Downlink Control Information (DCI), where the DCI indicates triggering a user equipment to perform inter-frequency signal measurement during a temporary measurement gap, and the temporary measurement gap is different from a periodic measurement gap used for the inter-frequency signal measurement.

According to a third aspect of examples of the present disclosure, there is provided a channel measurement apparatus, being applicable to a user equipment. The apparatus includes a measuring module, where the measuring module is configured to perform inter-frequency signal measurement during a temporary measurement gap, where the temporary measurement gap is different from a periodic measurement gap used for the inter-frequency signal measurement.

According to a fourth aspect of examples of the present disclosure, there is provided a channel measurement apparatus, being applicable to a base station. The apparatus includes a first sending module, where the first sending module is configured to transmit Downlink Control Information (DCI), where the DCI indicates triggering a user equipment to perform inter-frequency signal measurement during a temporary measurement gap, and the temporary measurement gap is different from a periodic measurement gap used for the inter-frequency signal measurement.

According to a fifth aspect of examples of the present disclosure, there is provided a communication device including a processor, a transceiver, a memory and an executable program stored on the memory and executed by the processor, where the processor executes the executable program to implement steps of a channel measurement method of the first aspect.

According to a sixth aspect of examples of the present disclosure, there is provided a communication device including a processor, a transceiver, a memory and an executable program stored on the memory and executed by the processor, where the processor executes the executable program to implement steps of a channel measurement method of the second aspect.

Examples of the present disclosure provide a channel measurement method and apparatus, and a communication device. Inter-frequency signal measurement is performed during a temporary measurement gap, where the temporary measurement gap is different from a periodic measurement gap used for the inter-frequency signal measurement. In this way, the inter-frequency signal measurement is performed during the configured temporary measurement gap, which improves the flexibility of selecting gaps for the inter-frequency signal measurement, and reduces problems that a user equipment is unable to perform handover or positioning in time and the like, which are caused by being unable to obtain time domain resources for the inter-frequency signal measurement.

It should be understood that the above general description and the following detailed description are just exemplary and explanatory, and cannot construed as a limit to the present disclosure.

BRIEF DESCRIPTION OF THE DRAWINGS

The drawings herein are incorporated into the specification and constitute a part of the specification, illustrate examples according to the present disclosure, and are used to explain the principle of the present disclosure along with the specification.

DETAILED DESCRIPTION OF THE PREFERRED EMBODIMENTS

Examples will be described in detail here, and examples thereof are illustrated in the accompanying drawings. When the following description relates to the drawings, unless otherwise indicated, the same reference signs in different drawings indicate the same or similar elements. The implementation manners described in the following examples do not represent all implementation manners consistent with the present disclosure. Rather, they are merely examples of devices and methods consistent with some aspects of the present disclosure as set forth in the appended claims.

Terms used in examples of the present disclosure is merely intended to describe particular examples and is not intended to limit examples of the present disclosure. The singular forms "a", "said" and "the" are also intended to include plural forms, unless the context clearly indicates otherwise. It should also be understood that the term "and/or" as used herein refers to and includes any or all possible combinations of one or more associated listed items.

It should be understood that, although the terms first, second, third and the like may be used herein to describe various information, the information should not be limited by these terms. These terms are only used to distinguish one category of information from another. For example, without departing from the scope of examples of the present disclosure, first information may be referred as second information; and similarly, second information may also be referred as first information. Depending on the context, for example, the word "if" as used herein may be interpreted as "at the time of" or "when" or "in response to determining".

Figure 1:
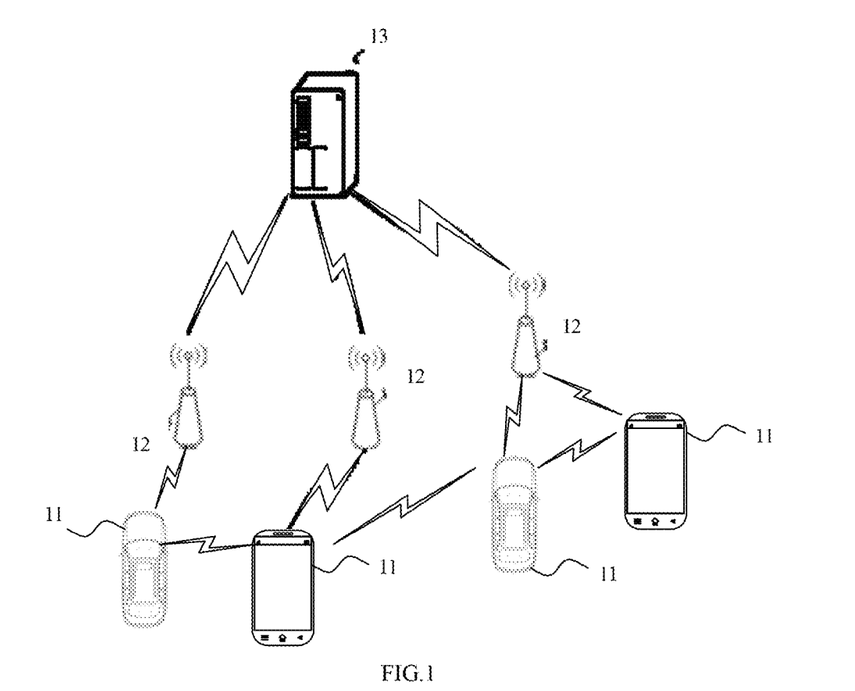
FIG. 1 is a structural schematic diagram illustrating a communication system according to an example.

FIG. 1 is a structural schematic diagram illustrating a wireless communication system according to an example of the present disclosure. As shown in FIG. 1, the wireless communication system is a communication system based on cellular mobile communication technology. The wireless communication system may include several terminals 11 and several base stations 12.

The terminal 11 may be referred to as a device providing voice and/or data connectivity to a user. The terminal 11 may communicate with one or more core networks through a Radio Access Network (RAN). The terminal 11 may include a terminal in Internet of Things, such as a sensor device, a mobile phone (or called a cellular phone), and a computer having a terminal of Internet of Things, such as a fixed, portable, pocket-size, handheld, or computer-inbuilt or vehicle-mounted apparatus. The terminal 11 may also include, for example, a STAtion (STA), a subscriber unit, a subscriber station, a mobile station, a mobile, a remote station, an access point, a remote terminal, an access terminal, a user terminal, a user agent, a user device, or a user equipment. Optionally, the terminal 11 may also include device carried on an unmanned aerial vehicle, or a vehicle-mounted device, for example, a trip computer having wireless communication function, or a wireless communication device externally connected to a trip computer. Optionally, the terminal 11 may be a roadside device, for example, may be a road lamp, a signal lamp or other roadside devices having wireless communication function.

The base station 12 may include a network side device in the wireless communication system. The wireless communication system may be the $4^{th}$-generation mobile communication technology (4G) system, which is also called the Long Term Evolution (LTE) system. Optionally, the wireless communication system may also include the 5G system, which is also called the New Radio (NR) system or the 5G NR system. Optionally, the wireless communication system may also include a next generation system of the 5G system. An access network in the 5G system may be referred to as New Generation-Radio Access Network (NG-RAN). Optionally, the wireless communication system may also include the MTC (Machine Type Communication) system.

The base station 12 may include an evolved Node B (eNB) base station employed in the 4G system. Optionally, the base station 12 may also include a base station (gNB) adopting centralized-distributed architecture in the 5G system. When adopting the centralized distributed architecture, the base station 12 usually includes a Central Unit (CU) and at least two Distributed Units (DUs). In the Central Unit, protocol stacks of a Packet Data Convergence Protocol (PDCP) layer, a Radio Link Control (RLC) layer and a Media Access Control (MAC) layer are disposed; and in the Distributed Unit(s), a Physical (PHY) layer protocol stack is disposed. Specific implementations of the base station 12 are not limited in the examples of the present disclosure.

Wireless connection between the base station 12 and the terminal 11 may be established through an air interface. In different implementations, the air interface is an air interface based on the $4^{th}$-generation mobile communication network technology (4G) standards; or, the air interface is an air interface based on the fifth generation mobile communication network technology (5G) standards, for example, the air interface is New Radio; or, the air interface may also be an air interface based on standards of a next generation mobile communication network technology of 5G.

In some embodiments, End to End (E2E) connection may further be established between the terminals 11, for example, in the scenarios of Vehicle to Vehicle (V2V) communication, Vehicle to Infrastructure (V2I) communication, and Vehicle to Pedestrian (V2P) communication and the like in Vehicle to everything (V2X) communication.

In some examples, the above wireless communication system may further include a network management device 13.

Several base stations 12 are connected to the network management device 13 respectively. The network management device 13 may include a core network device in the wireless communication system, for example, the network management device 13 may include a Mobility Management Entity (MME) in an Evolved Packet Core (EPC). Alternatively, the network management device may also include other core network devices, such as a Serving GateWay (SGW), a Public Data Network GateWay (PGW), Policy and Charging Rules Function (PCRF), or a Home Subscriber Server (HSS), and the like. The implementation morphology of the network management device 13 is not limited in the examples of the present disclosure.

An executing entity involved in examples of the present disclosure includes, but is not limited to, a user equipment, a base station and the like that use 5G NR technology for communication.

An application scenario of examples of the present disclosure includes that, in a case that a bandwidth of a UE's receiver is not sufficient to cover both service frequencies of the present cell and a neighbor cell to be measured, for ensuring the low latency of high-priority downlink services, for example, service data of Ultra Reliable and Low Latency Communication (URLLC), the UE continues receiving downlink data at a frequency of the serving cell during a measurement gap for an inter-frequency cell, rather than entering the measurement gap and performing measurement on the inter-frequency cell. In a case that the UE requires to perform the inter-frequency signal measurement at this moment, for example, the UE is to perform inter-frequency signal measurement to determine whether to perform handover, the UE cannot obtain measurement resources, thus making it impossible to perform handover in time.

Figure 2:
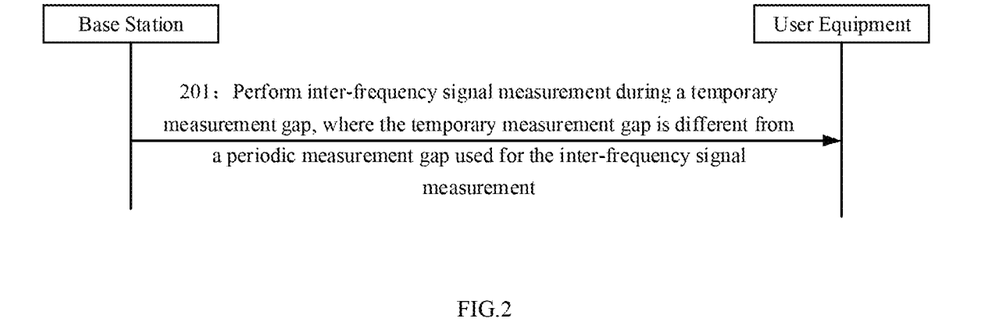
FIG. 2 is a schematic flowchart illustrating a channel measurement method according to an example.

As shown in FIG. 2, the present example provides a channel measurement method, which can be applied to a user equipment for wireless communication. The method includes the following step.

At step 201, inter-frequency signal measurement is performed during a temporary measurement gap, where the temporary measurement gap is different from a periodic measurement gap used for the inter-frequency signal measurement. An inter-frequency signal may be a signal with a central frequency different from a central frequency of a serving cell where the UE is currently located. The inter-frequency signal may also be a signal of an inter-frequency cell with one or more Band Width Parts (BWPs) other than a BWP currently occupied by the UE. The inter-frequency signal may further be one or more signals of inter-frequency cells with different central frequencies or different Sub-Carrier Spaces (SCSs) in SSB measurement and the like. The inter-frequency signal measurement may indicate performing signal quality measurement on an inter-frequency signal or listening to an inter-frequency signal.

A base station can allocate a periodic measurement gap, e.g., a periodic measurement interval, to the UE. The UE can periodically perform inter-frequency signal measurement during the periodic measurement gap.

In a case that a bandwidth of a UE's receiver is not sufficient to cover both signal frequencies of a serving cell and an inter-frequency cell, the UE cannot perform the inter-frequency signal measurement for the inter-frequency cell and data transmission for the serving cell at the same time. For example, the UE cannot, during the periodic measurement gap, simultaneously perform the inter-frequency signal measurement and receive downlink data from the serving cell using Physical Downlink Shared Channel (PDSCH) resources.

To ensure the low latency of high-priority downlink services such as service data of URLLC, the UE, during the periodic measurement gap for the inter-frequency cell, keeps receiving downlink data at the frequency of the serving cell without performing the inter-frequency signal measurement.

Figure 3:
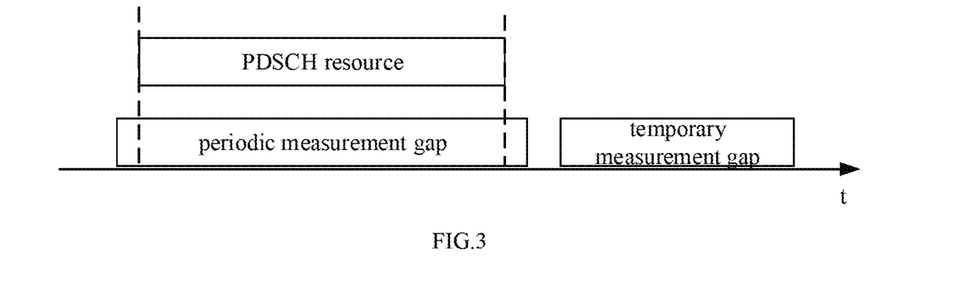
FIG. 3 is a schematic flowchart illustrating another channel measurement method according to an example.

As shown in FIG. 3, the periodic measurement gap overlaps with time domain PDSCH resources of high-priority downlink services, which makes it impossible to perform the inter-frequency signal measurement during the periodic measurement gap. A temporary measurement gap can be set outside the periodic measurement gap, and the UE may perform the inter-frequency signal measurement during the temporary measurement gap. The position for temporary measurement may be predetermined or indicated by signaling sent from the base station, etc.

The UE or the base station may set a temporary measurement gap for a periodic measurement gap that overlaps with the time domain PDSCH transmission resources. For example, a temporary measurement gap may be set after a periodic measurement gap that overlaps with the time domain PDSCH transmission resources, and the UE can perform the inter-frequency signal measurement during the temporary measurement gap. There may be one or more temporary measurement gaps.

In this way, performing the inter-frequency signal measurement during the configured temporary measurement gap improves the flexibility of selecting measurement gaps for one or more inter-frequency signals and reduces problems that a UE is unable to perform handover or positioning in time and the like, which are caused by being unable to obtain time domain resources for the inter-frequency signal measurement.

In a case that the periodic measurement gap does not overlap with the time domain PDSCH resources, the UE is able to perform the inter-frequency signal measurement, and the temporary measurement gap may not be set.

In one example, step 201 may include: receiving Downlink Control Information (DCI); and in response to determining that the DCI indicates triggering the temporary measurement gap, performing the inter-frequency signal measurement during the temporary measurement gap. The temporary measurement gap can be pre-configured through high-layer signaling, etc., and be triggered and enabled by the DCI.

An information field can be set in the DCI. The information field can occupy one or more bits and is used to trigger the temporary measurement gap. For example, the information field occupies 1 bit, "0" may be used to indicate that a temporary measurement gap is not triggered, and "1" may be used to indicate that a temporary measurement gap is triggered.

The temporary measurement gap for inter-frequency signal measurement may include: a temporary measurement gap for the UE to perform reference signal measurement on an inter-frequency cell; and/or a temporary duration for the UE to perform SSB listening on the inter-frequency cell. The information field that triggers the temporary measurement gap occupies two bits. The information field may use "00" to indicate that a temporary measurement gap is not triggered, use "01" to indicate that a temporary measurement gap for performing reference signal measurement on an inter-frequency cell is triggered, and use "10" to indicate that a temporary duration for performing SSB listening on an inter-frequency cell is triggered.

In this way, the base station uses DCI to indicate whether the UE uses a temporary measurement gap, which improves the flexibility of triggering a temporary measurement gap.

In one example, step 201 may include performing the inter-frequency signal measurement during a temporary measurement gap, where a start time point of the temporary measurement gap is later than a reception time point of the DCI, and an interval between the two time points is a first time length.

A time offset of the start moment of the temporary measurement gap relative to the DCI reception moment, that is, the first time length, can be stipulated in a communication protocol or the like. Upon receiving DCI indicating that a temporary measurement gap is to be enabled, the UE enables a temporary measurement gap at a position stipulated in the communication protocol, and the inter-frequency signal measurement is performed during the temporary measurement gap.

The first time length can be determined according to a response speed of the UE. For example, the UE is expected to resolve the DCI after receiving the DCI, and in this case, the first time length may indicate a time period for the UE to resolve the DCI.

In one example, the channel measurement method may further include: determining the first time length based on an indication of received first Radio Resource Control (RRC) signaling.

For example, the base station uses RRC signaling to configure the time offset between the temporary measurement gap and the received DCI which indicates that the temporary measurement gap is to be enabled. For example, an interval value in RRC configuration is 3 ms, and the UE receives the DCI, and then, after a 3 ms interval, starts entering the temporary measurement gap. Assuming that a length of the temporary measurement gap configured by the base station is 4 ms, the UE may, at the end of the temporary measurement gap, switch to a frequency of the serving cell to start normal downlink data reception.

In one example, the first time length includes one or more symbols, or one or more slots.

The first time length agreed by the communication protocols and/or configured by the RRC signaling may be represented by symbol(s) or slot(s). For example, the first time length configured by the RRC signaling may indicate 3 slots. In a case that the DCI is received at slot #15, and then, at slot #18, the UE can start entering the temporary measurement gap. Assuming that a time length of a slot is 1 ms, and a time length of the temporary measurement gap configured by the base station is 4 ms, and then the UE may stay in the temporary measurement gap at slots #18, #19, #20, #21 and use the frequency of the serving cell at slot #22 to start normal downlink data reception.

It can also be stipulated in the communication protocol that the temporary measurement gap is entered after an interval of M symbols from the symbol where the DCI is received. For example, a slot may contain 12 symbols.

In one example, the first time length is longer than a time period for the UE to resolve the DCI. Since the UE can determine whether a temporary measurement gap is triggered after demodulating the DCI, the first time length can be set to be longer than the time period for the UE to demodulate the DCI. In this way, it can be ensured that the DCI has been demodulated when the temporary measurement gap starts.

In one example, in response to determining that a Physical Downlink Shared CHannel (PDSCH) resource with a predetermined priority and the periodic measurement gap have an overlapping period in a time domain, a base station transmits the DCI and the DCI can be received by the UE.

Since both the PDSCH resource and the periodic measurement gap are scheduled or configured by the base station, the base station can determine whether the PDSCH resource and the periodic measurement gap have an overlapping period in the time domain, that is, whether the PDSCH resource clashes with the periodic measurement gap. In response to determining that there is an overlapping period, the base station may transmit DCI to trigger a temporary measurement gap.

In one example, in response to determining that a Semi-Persistent Scheduling (SPS) PDSCH resource with the predetermined priority and the periodic measurement gap have an overlapping period in the time domain, the base station transmits the DCI prior to the overlapping period and the DCI can be received by the UE.

A PDSCH resource may include a SPS PDSCH resource. Both the SPS PDSCH resource and the periodic measurement gap may be semi-statically configured by the base station through RRC layer signaling. In this way, both the base station and the UE can predict whether a case of being unable to perform inter-frequency signal measurement occurs, which is caused by a clash between the SPS PDSCH resource and the periodic measurement gap. Therefore, the base station can issue DCI to trigger a temporary measurement gap before the clash occurs, that is, prior to the overlapping period.

In one example, the channel measurement method further includes keeping downlink communication with the base station during the overlapping period.

To ensure the transmission of high-priority downlink services, downlink communication between the UE and the base station can be maintained during the overlapping period between the PDSCH resource used for transmitting the high-priority downlink services and the periodic measurement gap. The high-priority downlink services may include URLLC services, etc., and the downlink communication includes transmission of high-priority downlink service data, etc.

In one example, step 201 further includes: in response to determining that a PDSCH resource with a predetermined priority and the periodic measurement gap have an overlapping period in the time domain, performing the inter-frequency signal measurement during the temporary measurement gap, where a start time point of the temporary measurement gap is later than an end time point of the periodic measurement gap, and an interval between the two time points is a second time length.

In a case that a periodic measurement gap and a PDSCH resource for receiving SPS downlink data have an overlapping period in the time domain, the periodic measurement gap cannot be used for inter-frequency signal measurement, and the base station can set a temporary measurement gap with an interval as the second time length from an end time point of the clashing periodic measurement gap.

For example, in case that a periodic measurement gap clashes with a PDSCH resource and the UE cannot use the periodic measurement gap, a temporary measurement gap is started after a duration of T from the end time of the periodic measurement gap. A time length of the temporary measurement gap can be configured by the base station through RRC.

Figure 4:
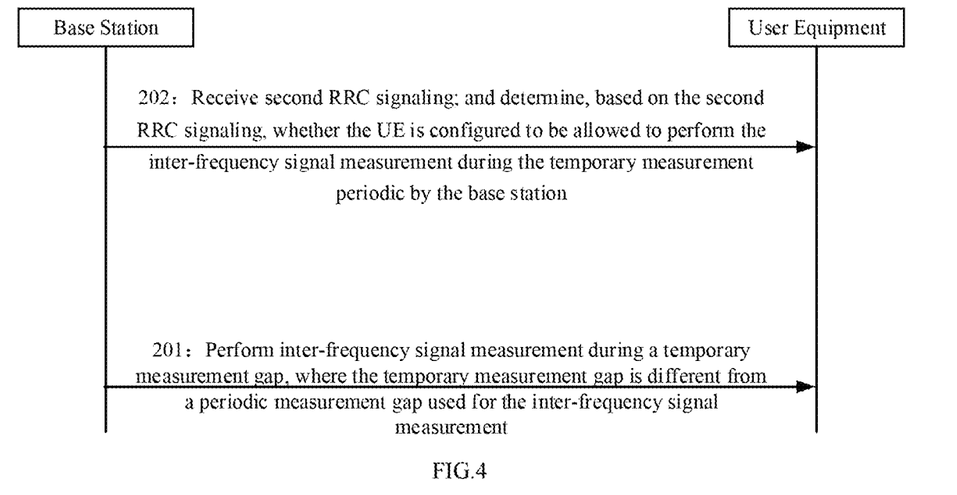
FIG. 4 is a schematic diagram illustrating a position of a temporary measurement gap according to an example.

In one example, as shown in FIG. 4, prior to step 201, the channel measurement method further includes, at step 202, receiving second RRC signaling; and determining, based on the second RRC signaling, whether the UE is configured to be allowed to perform the inter-frequency signal measurement during the temporary measurement gap by the base station.

For example, when indication information of the second RRC signaling indicates that the UE is allowed to perform inter-frequency signal measurement during a temporary measurement gap, and the temporary measurement gap is triggered by triggering information included in DCI, the UE can perform the inter-frequency signal measurement during the temporary measurement gap, or when the indication information of the second RRC signaling indicates that the UE is allowed to perform inter-frequency signal measurement during a temporary measurement gap, and a position of the temporary measurement gap is stipulated in a communication protocol, the UE can perform the inter-frequency signal measurement during the temporary measurement gap at the stipulated position.

In one example, the channel measurement method can further include: determining, based on received third RRC signaling, a time length of the temporary measurement gap. The base station can set, in a predetermined information field of the third RRC signaling, indication information for indicating a time length of the temporary measurement gap. When the third RRC signaling is received, the UE can determine the time length of the temporary measurement gap according to the indication information in the predetermined information field.

The first RRC signaling, the second RRC signaling and the third RRC signaling may be the same RRC signaling, or may be different RRC signaling. Any two of the first RRC signaling, the second RRC signaling and the third RRC signaling may be the same RRC signaling.

In one example, the inter-frequency signal measurement includes at least one of: reference signal measurement performed on an inter-frequency cell; or SSB listening performed on the inter-frequency cell.

The temporary measurement gap for the UE to perform the inter-frequency signal measurement on the inter-frequency cell includes at least one of: a temporary measurement gap for the UE to perform reference signal measurement on the inter-frequency cell; or a temporary duration for the UE to perform SSB listening on the inter-frequency cell.

The reference signal measurement may include that a UE measures a reference signal from an inter-frequency cell for performing mobility measurement. The UE may measure the reference signal from the inter-frequency cell during the temporary measurement gap.

The base station may configure a temporary duration for the UE to listen to the SSB from the inter-frequency cell.

Figure 5:
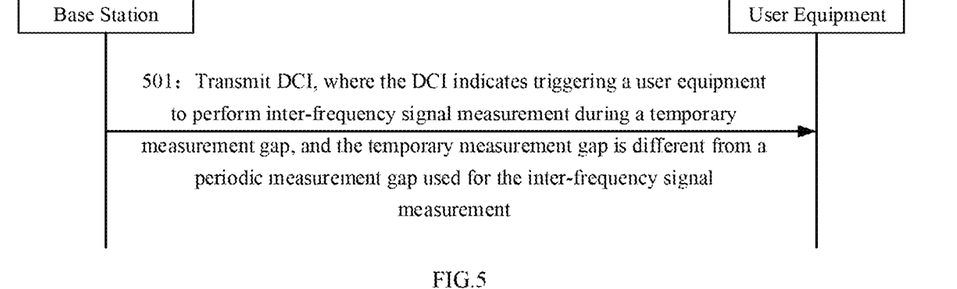
FIG. 5 is a schematic flowchart illustrating a channel measurement method according to an example.

As shown in FIG. 5, the present example provides a channel measurement method, which can be applied to a base station for wireless communication. The method includes the following step.

At step 501, DCI is transmitted, where the DCI indicates triggering a user equipment to perform inter-frequency signal measurement during a temporary measurement gap, and the temporary measurement gap is different from a periodic measurement gap used for the inter-frequency signal measurement.

An inter-frequency signal may be a signal with a central frequency different from a central frequency of a serving cell where the UE is currently located. The inter-frequency signal may also be a signal of an inter-frequency cell with one or more Band Width Parts (BWPs) other than a BWP currently occupied by the UE. The inter-frequency signal may further be one or more signals of inter-frequency cells with different central frequencies or different Sub-Carrier Spaces (SCSs) in SSB measurement and the like. The inter-frequency signal measurement may indicate performing signal quality measurement on an inter-frequency signal or listening to an inter-frequency signal.

A base station can allocate a periodic measurement gap, e.g., a periodic measurement interval, to the UE. The UE can periodically perform inter-frequency signal measurement during the periodic measurement gap.

In a case that a bandwidth of a UE's receiver is not sufficient to cover both signal frequencies of a serving cell and an inter-frequency cell, the UE cannot perform the inter-frequency signal measurement for the inter-frequency cell and data transmission for the serving cell at the same time. For example, the UE cannot, during the periodic measurement gap, simultaneously perform the inter-frequency signal measurement and receive downlink data from the sewing cell using Physical Downlink Shared Channel (PDSCH) resources.*

To ensure the low latency of high-priority downlink services such as service data of URLLC, the UE, during the periodic measurement gap for the inter-frequency cell, keeps receiving downlink data at the frequency of the serving cell without performing the inter-frequency signal measurement.

As shown in FIG. 3, the periodic measurement gap overlaps with time domain PDSCH resources of high-priority downlink services, which makes it impossible to perform the inter-frequency signal measurement during the periodic measurement gap. A temporary measurement gap can be set outside the periodic measurement gap, and the UE may perform the inter-frequency signal measurement during the temporary measurement gap. The position for temporary measurement may be predetermined or indicated by signaling sent from the base station, etc.

The UE or the base station may set a temporary measurement gap for a periodic measurement gap that overlaps with the time domain PDSCH transmission resources. For example, a temporary measurement gap may be set after a periodic measurement gap that overlaps with the time domain PDSCH transmission resources, and the UE can perform the inter-frequency signal measurement during the temporary measurement gap. There may be one or more temporary measurement gaps.

In this way, performing the inter-frequency signal measurement during the configured temporary measurement gap improves the flexibility of selecting measurement gaps for one or more inter-frequency signals and reduces problems that a UE is unable to perform handover or positioning in time and the like, which are caused by being unable to obtain time domain resources for the inter-frequency signal measurement.

In a case that the periodic measurement gap does not overlap with the time domain PDSCH resources, the UE is able to perform the inter-frequency signal measurement, and the temporary measurement gap may not be set.

The UE can receive DCI, and in response to determining that the DCI indicates triggering a temporary measurement gap, perform the inter-frequency signal measurement during the temporary measurement gap. The temporary measurement gap can be pre-configured through high-layer signaling, etc., and be triggered and enabled by the DCI.

An information field can be set in the DCI. The information field can occupy one or more bits and is used to trigger the temporary measurement gap. For example, the information field occupies 1 bit, "0" may be used to indicate that a temporary measurement gap is not triggered, and "1" may be used to indicate that a temporary measurement gap is triggered.

The temporary measurement gap for inter-frequency signal measurement may include: a temporary measurement gap for the UE to perform reference signal measurement on an inter-frequency cell; and/or a temporary duration for the UE to perform SSB listening on the inter-frequency cell. The information field that triggers the temporary measurement gap occupies two bits. The information field may use "00" to indicate that a temporary measurement gap is not triggered, use "01" to indicate that a temporary measurement gap for performing reference signal measurement on an inter-frequency cell is triggered, and use "10" to indicate that a temporary duration for performing SSB listening on an inter-frequency cell is triggered.

In this way, the base station uses DCI to indicate whether the UE uses a temporary measurement gap, which improves the flexibility of triggering a temporary measurement gap.

Figure 6:
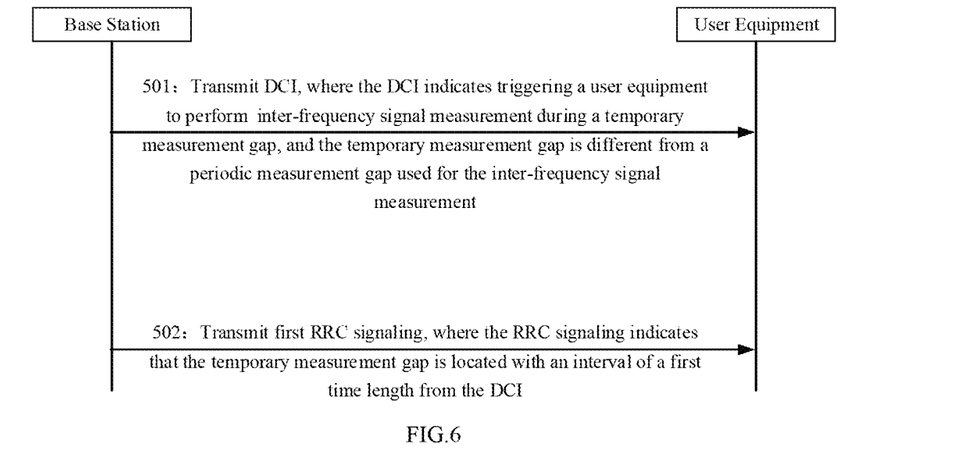
FIG. 6 is a schematic flowchart illustrating another channel measurement method according to an example.

In one example, as shown in FIG. 6, the channel measurement method can further include, at step 502, first Radio Resource Control (RRC) signaling is transmitted, where the RRC signaling indicates a first time length, a start time point of the temporary measurement gap is later than a reception time point of the DCI, and an interval between the two time points is the first time length. The first time length can be determined according to a response speed of the UE. For example, the UE is expected to resolve the DCI after receiving the DCI, and in this case, the first time length may indicate a time period for the UE to resolve the DCI.

For example, the base station uses RRC signaling to configure the time offset between the temporary measurement gap and the received DCI which indicates that the temporary measurement gap is to be enabled. For example, an interval value in RRC configuration is 3 ms, and the UE receives the DCI, and then, after a 3 ms interval, starts entering the temporary measurement gap. Assuming that a length of the temporary measurement gap configured by the base station is 4 ms, the UE may, at the end of the temporary measurement gap, switch to a frequency of the serving cell to start normal downlink data reception.

In one example, the first time length includes one or more symbols or one or more slots. The first time length agreed by the communication protocols or configured by the RRC signaling may be represented by symbol(s) or slot(s).

For example, the first time length configured by the RRC signaling may indicate 3 slots. In a case that the DCI is received at slot #15, and then, at slot #18, the UE can start entering the temporary measurement gap. Assuming that a time length of a slot is 1 ms, and a time length of the temporary measurement gap configured by the base station is 4 ms, and then the UE may stay in the temporary measurement gap at slots #18, #19, #20, #21 and use the frequency of the serving cell at slot #22 to start normal downlink data reception.

It can also be stipulated in the communication protocol that the temporary measurement gap is entered after an interval of M symbols from the symbol where the DCI is received. For example, a slot may contain 12 symbols.

In one example, the first time length is longer than a time period for the user equipment to resolve the DCI.

Since the UE can determine whether a temporary measurement gap is triggered after demodulating the DCI, the first time length can be set to be longer than the time period for the UE to demodulate the DCI. In this way, it can be ensured that the DCI has been demodulated when the temporary measurement gap starts.

In one example, step 501 can include, in response to determining that a Physical Downlink Shared CHannel (PDSCH) resource with a predetermined priority and the periodic measurement gap have an overlapping period in a time domain, transmitting the DCI.

Since both the PDSCH resource and the periodic measurement gap are scheduled or configured by the base station, the base station can determine whether the PDSCH resource and the periodic measurement gap have an overlapping period in the time domain, that is, whether the PDSCH resource clashes with the periodic measurement gap. In response to determining that there is an overlapping period, the base station may transmit DCI to trigger a temporary measurement gap.

In one example, in response to determining that the PDSCH resource with the predetermined priority and the periodic measurement gap have the overlapping period in the time domain, transmitting the DCI includes, in response to determining that a Semi-Persistent Scheduling (SPS) PDSCH resource with the predetermined priority and the periodic measurement gap have an overlapping period in the time domain, transmitting the DCI prior to the overlapping period.

A PDSCH resource may include a SPS PDSCH resource. Both the SPS PDSCH resource and the periodic measurement gap may be semi-statically configured by the base station through RRC layer signaling. In this way, both the base station and the UE can predict whether a case of being unable to perform inter-frequency signal measurement occurs, which is caused by a clash between the SPS PDSCH resource and the periodic measurement gap. Therefore, the base station can issue DCI to trigger a temporary measurement gap before the clash occurs, that is, prior to the overlapping period.

In one example, the channel measurement method can further include keeping downlink communication with the user equipment during the overlapping period. To ensure the transmission of high-priority downlink services, downlink communication between the UE and the base station can be maintained during the overlapping period between the PDSCH resource used for the high-priority downlink services and the periodic measurement gap. The high-priority downlink services may include URLLC services, etc., and the downlink communication includes transmission of high-priority downlink service data, etc.

In one example, the channel measurement method can further include transmitting second RRC signaling, where the second RRC signaling configures whether the user equipment is allowed to perform the inter-frequency signal measurement during the temporary measurement gap.

The base station can indicate, through indication information of the second RRC signaling, whether the user equipment is allowed to perform the inter-frequency signal measurement during the temporary measurement gap.

For example, when the indication information of the second RRC signaling indicates that the UE is allowed to perform inter-frequency signal measurement during a temporary measurement gap, and the temporary measurement gap is triggered by triggering information included in DCI, the UE can perform the inter-frequency signal measurement during the temporary measurement gap, or when the indication information of the second RRC signaling indicates that the UE is allowed to perform inter-frequency signal measurement during a temporary measurement gap, and a position of the temporary measurement gap is stipulated in a communication protocol, the UE can perform the inter-frequency signal measurement during the temporary measurement gap at the stipulated position.

In one example, the channel measurement method can further include transmitting third RRC signaling, where the third RRC signaling indicates a time length of the temporary measurement gap. The base station can set, in a predetermined information field of the third RRC signaling, indication information for indicating a time length of the temporary measurement gap. When the third RRC signaling is received, the UE can determine the time length of the temporary measurement gap according to the indication information in the predetermined information field.

The first RRC signaling, the second RRC signaling and the third RRC signaling may be the same RRC signaling, or may be different RRC signaling. Any two of the first RRC signaling, the second RRC signaling and the third RRC signaling may be the same RRC signaling.

A specific example is provided below in conjunction with any of the above-mentioned examples.

DCI transmitted by a base station to a UE has an information field for indicating whether a temporary measurement gap is triggered. For example, the information field is of 2 bits, which means not to trigger in a case of being 00, triggering a temporary measurement gap in a case of being 10, and triggering a SMTC temporary duration in a case of being 10.

Whether the above information field is present in the DCI depends on RRC configuration. For example, in a case that the base station uses RRC signaling to configure that a temporary measurement gap is allowed to be triggered for the UE, and then the above-mentioned information field can be present in the DCI. In a case that the base station configures not allowing to trigger a temporary measurement gap for the UE, there will be no such information field in the DCI.

When DCI for triggering a temporary measurement gap is received, the UE can determine a time domain position of the temporary measurement gap in the following manner.

1. In RRC layer, an interval between the temporary measurement gap and a slot where the received DCI is located is configured. For example, an interval value in RRC configuration may be 3 slots and DCI is at slot #15, and then, at slot #18, the UE can start entering the temporary measurement gap. Assuming that a time length of a slot is 1 ms, and a time length of the temporary measurement gap configured by the base station is 4 ms, and then the UE may stay in the temporary measurement gap at slots #18, #19, #20, #21 and use the frequency of the serving cell at slot #22 to start normal downlink data reception.

2. It is stipulated in a communication protocol that the temporary measurement gap is entered after an interval of M symbols from the symbol where the DCI is located. Since the UE can determine whether a temporary measurement gap is triggered after demodulating the DCI, the M symbols should be longer than a time period for the UE to demodulate the DCI.

In a case that URLLC services are transmitted using SPS PDSCH transmission resources, since the SPS PDSCH transmission resources and a periodic measurement gap may be semi-statically configured by the base station through RRC layer signaling, both the base station and the UE can predict whether a phenomenon of being unable to perform inter-frequency signal measurement, which is caused by that the SPS PDSCH transmission resources clash with the periodic measurement gap. Therefore, the base station can issue the above-mentioned DCI for triggering a temporary measurement gap before the clash occurs. As it should be, when the clash occurs, the base station can also trigger a temporary measurement gap.

The base station can trigger one or more temporary measurement gaps according to actual measurement needs, which is not limited to triggering only when a clash occurs.

In case that a certain periodic measurement gap clashes with a SPS PDSCH transmission resource and the UE cannot use the periodic measurement gap, a temporary measurement gap is started after a duration of T from an end time of the periodic measurement gap. A time length of the temporary measurement gap can be configured by the base station through RRC.

Figure 7:
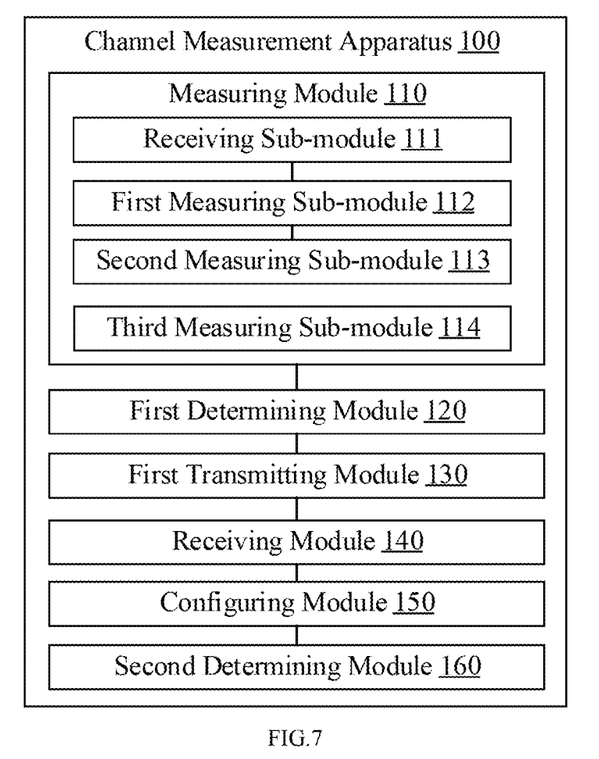
FIG. 7 is a structural block diagram illustrating a composition of a channel measurement apparatus according to an example.

Examples of the present disclosure further provide a channel measurement apparatus, which is applied to a user equipment for wireless communication. FIG. 7 is a structural diagram illustrating a composition of a channel measurement apparatus 100 according to the examples of the present disclosure. As shown in FIG. 7, the apparatus 100 includes a measuring module 110, where the measuring module 110 is configured to perform inter-frequency signal measurement during a temporary measurement gap, where the temporary measurement gap is different from a periodic measurement gap used for the inter-frequency signal measurement.

In one example, the measuring module 110 includes a receiving sub-module 111, configured to receive Downlink Control Information (DCI), and a first measuring sub-module 112, configured to perform, in response to determining that the DCI indicates triggering the temporary measurement gap, the inter-frequency signal measurement during the temporary measurement gap.

In one example, the measuring module 110 includes a second measuring sub-module 113, configured to perform, during a temporary measurement gap with an interval of a first time length from receiving the DCI, the inter-frequency signal measurement.

In one example, the apparatus 100 further includes:
a first determining module 120, configured to determine the first time length based on an indication of received first Radio Resource Control (RRC) signaling.

In one example, the first time length includes one or more symbols, or one or more slots.

In one example, the first time length is longer than a time period for the UE to resolve the DCI.

In one example, the DCI is transmitted by a base station in response to determining that a Physical Downlink Shared CHannel (PDSCH) resource with a predetermined priority and the periodic measurement gap have an overlapping period in a time domain.

In one example, the DCI is transmitted by the base station in response to determining that a Semi-Persistent Scheduling (SPS) PDSCH resource with the predetermined priority and the periodic measurement gap have an overlapping period in the time domain, and the DCI is transmitted prior to the overlapping period.

In one example, the apparatus 100 further includes a first transmitting module 130, configured to keep downlink communication with the base station during the overlapping period.

In one example, the measuring module 110 includes a third measuring sub-module 114, configured to perform, in response to determining that a PDSCH resource with a predetermined priority and the periodic measurement gap have an overlapping period in a time domain, the inter-frequency signal measurement during the temporary measurement gap which has an interval of a second time length from an end of the periodic measurement gap.

In one example, the apparatus 100 further includes a receiving module 140, configured to receive second RRC signaling, and a configuring module 150, configured to determine, based on the second RRC signaling, whether the UE is configured to be allowed to perform the inter-frequency signal measurement during the temporary measurement gap.

In one example, the apparatus 100 further includes:
a second determining module 160, configured to determine, based on received third RRC signaling, a time length of the temporary measurement gap.

In one example, the inter-frequency signal measurement includes at least one of:
reference signal measurement performed on an inter-frequency cell, or SSB listening performed on the inter-frequency cell.

Figure 8:
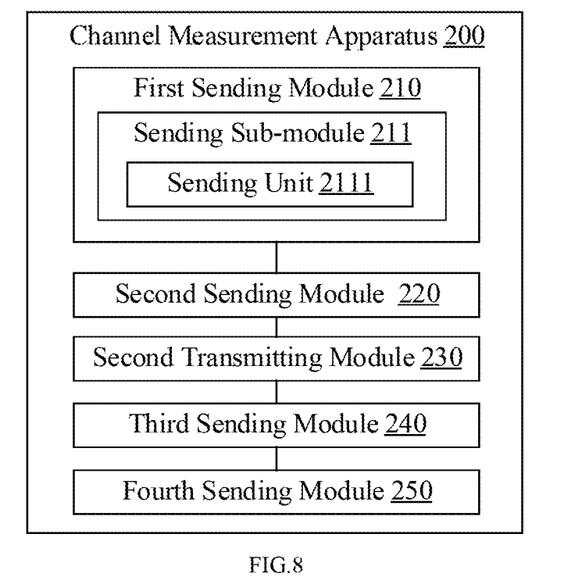
FIG. 8 is a structural block diagram illustrating a composition of another channel measurement apparatus according to an example.

Examples of the present disclosure further provide a channel measurement apparatus, which is applied to a base station for wireless communication. FIG. 8 is a structural diagram illustrating a composition of a channel measurement apparatus 200 according to the examples of the present disclosure. As shown in FIG. 8, the apparatus 200 includes a first sending module 210, where the first sending module 210 is configured to transmit DCI, where the DCI indicates triggering a user equipment to perform inter-frequency signal measurement during a temporary measurement gap, and the temporary measurement gap is different from a periodic measurement gap used for the inter-frequency signal measurement.

In one example, the apparatus 200 further includes a second sending module 220, configured to transmit first Radio Resource Control (RRC) signaling, where the RRC signaling indicates that the temporary measurement gap is located with an interval of a first time length from the DCI.

In one example, the first time length includes one or more symbols, or one or more slots.

In one example, the first time length is longer than a time period for the user equipment to resolve the DCI.

In one example, the first sending module 210 includes a sending sub-module 211, configured to transmit, in response to determining that a Physical Downlink Shared CHannel (PDSCH) resource with a predetermined priority and the periodic measurement gap have an overlapping period in a time domain, the DCI.

In one example, the sending sub-module 211 includes a sending unit 2111, configured to transmit, in response to determining that a Semi-Persistent Scheduling (SPS) PDSCH resource with the predetermined priority and the periodic measurement gap have an overlapping period in the time domain, the DCI prior to the overlapping period.

In one example, the apparatus 200 further includes a second transmitting module 230, configured to keep downlink communication with the user equipment during the overlapping period.

In one example, the apparatus 200 further includes:
a third sending module 240, configured to transmit second RRC signaling, where the second RRC signaling configures whether the user equipment is allowed to perform the inter-frequency signal measurement during the temporary measurement gap.

In one example, the apparatus 200 further includes a fourth sending module 250, configured to transmit third RRC signaling, where the third RRC signaling indicates a time length of the temporary measurement gap.

In one example, the measuring module 110, the first determining module 120, the first transmitting module 130, the receiving module 140, the configuring module 150, the second determining module 160, the first sending module 210, the second sending module 220, the second transmitting module 230, the third sending module 240, the fourth sending module 250 and the like can be implemented by one or more Central Processing Units (CPUs), Graphics Processing Units (GPUs), baseband processors (BPs), Application Specific Integrated Circuits (ASICs), digital signal processing devices (DSPs), Programmable Logic Devices (PLDs), Complex Programmable Logic Devices (CPLDs), Field-Programmable Gate Array (FPGA), general-purpose processors, controllers, Micro Controller Units (MCUs), microprocessors or other electronic elements for performing the above method.

Figure 9:
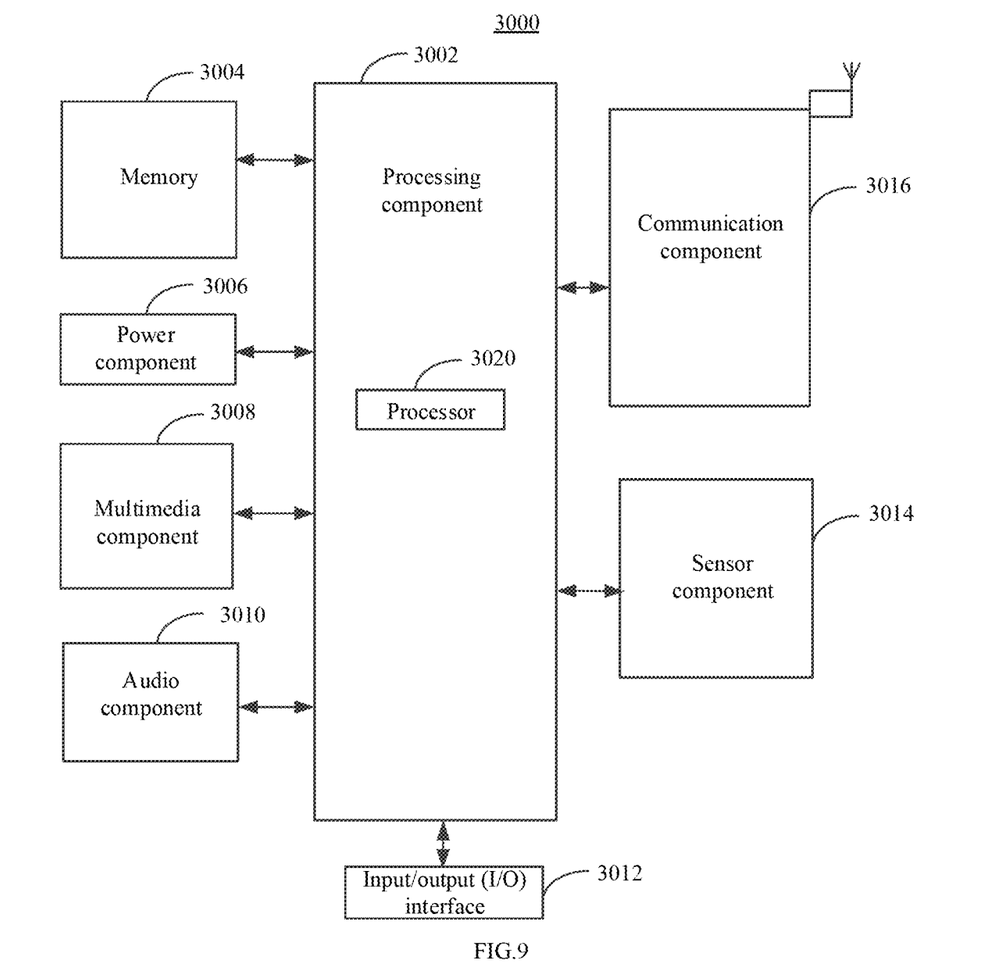
FIG. 9 is a block diagram illustrating a device for channel measurement according to an example.

FIG. 9 is a schematic block diagram illustrating a device 3000 for channel measurement according to an example of the present disclosure. For example, device 3000 can be a mobile phone, a computer, a digital broadcast terminal, a message transmitting and receiving device, a gaming console, a tablet device, a medical device, a fitness device, a personal digital assistant, and the like.

As shown in FIG. 9, the device 3000 may include one or more of the following components: a processing component 3002, a memory 3004, a power supply component 3006, a multimedia component 3008, an audio component 3010, an input/output (I/O) interface 3012, a sensor component 3014, and a communication component 3016.

The processing component 3002 generally controls overall operations of the device 3000, such as operations associated with display, phone calls, data communications, camera operations, and recording operations. Processing component 3002 can include one or more processors 3020 to execute instructions to perform all or part of the steps described above. In addition, the processing component 3002 may include one or more modules which facilitate the interaction between the processing component 3002 and other components. For example, processing component 3002 can include a multimedia module to facilitate interaction between multimedia component 3008 and processing component 3002.

Memory 3004 is configured to store various types of data to support operation at device 3000. Examples of such data include instructions for any application or method operated on the device 3000, contact data, phonebook data, messages, pictures, videos, and so on. The memory 3004 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

Power component 3006 provides power to various components of device 3000. Power component 3006 can include a power management system, one or more power sources, and other components associated with generating, managing, and distributing power for device 3000.

The multimedia component 3008 includes a screen between the device 3000 and the user that provides an output interface. In some examples, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensor may sense not only the boundary of the touch or sliding action, but also the duration and pressure associated with the touch or slide operation. In some examples, the multimedia component 3008 may include a front camera and/or a rear camera. In response to the device 3000 being in an operation mode, such as a shooting mode or a video mode, the front camera and/or the rear camera can receive external multimedia data. Each front and rear camera can be a fixed optical lens system or have focal length and optical zoom capabilities.

The audio component 3010 may be configured to output and/or input an audio signal. For example the audio component 3010 may include a microphone (MIC) configured to receive an external audio signal in response to the device 3000 being in an operating mode, such as a call mode, a recording mode, and a voice recognition mode. The received audio signal may be further stored in the memory 3004 or sent via the communication component 3016. In some examples, the audio component 3010 further includes a speaker to output an audio signal.

The I/O interface 3012 provides an interface between the processing component 3002 and peripheral interface modules. The above peripheral interface modules may be a keyboard, a click wheel, buttons, and so on. These buttons may include, but are not limited to, a home button, a volume button, a start button, and a lock button.

The sensor component 3014 may include one or more sensors to provide status assessments of various aspects for the device 3000. For example, sensor component 3014 can detect an open/closed state of device 3000, a relative positioning of components, such as the display and keypad of device 3000, and sensor component 3014 can also detect a change in position of device 3000 or a component of device 3000, the presence or absence of user contact with device 3000, orientation or acceleration/deceleration of device 3000, and temperature change of device 3000. The sensor component 3014 may include a proximity sensor configured to detect the presence of a nearby object without any physical contact. The sensor component 3014 may further include an optical sensor, such as a CMOS or CCD image sensor which is used in imaging applications. In some examples, the sensor component 3014 may further include an acceleration sensor, a gyroscope sensor, a magnetic sensor, a pressure sensor, or a temperature sensor.

The communication component 3016 may be configured to facilitate wired or wireless communication between the device 3000 and other devices. The device 3000 can access a wireless network based on any communication standard, such as WiFi, 2G, 30G, 4G or 5G or a combination thereof. In an exemplary example, communication component 3016 receives broadcast signals or broadcast associated information from an external broadcast management system via a broadcast channel. In an exemplary example, the communication component 3016 also includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology, and other technologies.

In an exemplary example, device 3000 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic elements for performing the method described in any of the above examples.

In an example, there is also provided a non-transitory computer readable storage medium including instructions, such as a memory 3004 including instructions executable by processor 3020 of device 3000 to perform the above method. For example, the non-transitory computer readable storage medium may be a ROM, a random access memory (RAM), a CD-ROM, a magnetic tape, a floppy disk, and an optical data storage device.

Other implementations of the present disclosure will be readily apparent to those skilled in the art after implementing the disclosure by referring to the specification. The present application is intended to cover any variations, uses, or adaptations of the present disclosure, which are in accordance with the general principles of the present disclosure and include common general knowledge or conventional technical means in the art that are not disclosed in the present disclosure. The specification and examples therein are only illustrative, and the scope and spirit of the disclosure are to be indicated by appended claims.

It is to be understood that this disclosure is not limited to the above described structures shown in the drawings, and various changes and modifications can be made to the disclosure without departing from the scope thereof. The scope of the disclosure is to be limited only by the appended claims.

The invention claimed is:

1. A channel measurement method, being applied to a User Equipment (UE) and comprising:
   performing inter-frequency signal measurement during a temporary measurement gap, wherein the temporary measurement gap is different from a periodic measurement gap used for the inter-frequency signal measurement;
   wherein performing the inter-frequency signal measurement during the temporary measurement gap comprises:
      receiving Downlink Control Information (DCI); and
      performing, in response to determining that the DCI indicates triggering the temporary measurement gap, the inter-frequency signal measurement during the temporary measurement gap, wherein a start time point of the temporary measurement gap is later than a reception time point of the DCI, and an interval between the two time points is a first time length.

2. The method according to claim 1, further comprising:
   determining the first time length based on an indication of received first Radio Resource Control (RRC) signaling.

3. The method according to claim 1, wherein the first time length comprises:
   one or more symbols;
   or
   one or more slots;
   or
   wherein the first time length is longer than a time period for the UE to resolve the DCI.

4. The method according to claim 1, wherein the DCI is transmitted by a base station in response to determining that a Physical Downlink Shared CHannel (PDSCH) resource with a predetermined priority and the periodic measurement gap have an overlapping period in a time domain.

5. The method according to claim 1, wherein the DCI is transmitted by a base station in response to determining that a Semi-Persistent Scheduling (SPS) Physical Downlink Shared CHannel (PDSCH) resource with a predetermined priority and the periodic measurement gap have an overlapping period in a time domain, and the DCI is transmitted prior to the overlapping period.

6. The method according to claim 4, further comprising:
   keeping downlink communication with the base station during the overlapping period.

7. The method according to claim 1, wherein performing the inter-frequency signal measurement during the temporary measurement gap comprises:
   performing, in response to determining that a Physical Downlink Shared CHannel (PDSCH) resource with a predetermined priority and the periodic measurement gap have an overlapping period in a time domain, the inter-frequency signal measurement during the temporary measurement gap, wherein a start time point of the temporary measurement gap is later than an end time point of the periodic measurement gap, and an interval between the two time points is a second time length.

8. The method according to claim 1, further comprising at least one of:
   determining, based on received second Radio Resource Control (RRC) signaling, whether the UE is configured to be allowed to perform the inter-frequency signal measurement during the temporary measurement gap, wherein the received second RRC signaling is received prior to performing the inter-frequency signal measurement during the temporary measurement gap;

or determining, based on received third RRC signaling, a time length of the temporary measurement gap.

9. The method according to claim 1, wherein the inter-frequency signal measurement comprises at least one of:

reference signal measurement performed on an inter-frequency cell;

or

Synchronization Signal Block (SSB) listening performed on the inter-frequency cell.

10. A channel measurement method, being applicable to a base station and comprising:

transmitting Downlink Control Information (DCI), wherein the DCI indicates triggering a user equipment to perform inter-frequency signal measurement during a temporary measurement gap, and the temporary measurement gap is different from a periodic measurement gap used for the inter-frequency signal measurement; and transmitting first Radio Resource Control (RRC) signaling, wherein the RRC signaling indicates a first time length, a start time point of the temporary measurement gap is later than a reception time point of the DCI, and an interval between the two time points is the first time length.

11. The method according to claim 10, wherein the first time length comprises:

one or more symbols;

or one or more slots;

or wherein the first time length is longer than a time period for the user equipment to resolve the DCI.

12. The method according to claim 10, wherein transmitting the DCI comprises:

transmitting, in response to determining that a Physical Downlink Shared CHannel (PDSCH) resource with a predetermined priority and the periodic measurement gap have an overlapping period in a time domain, the DCI.

13. The method according to claim 10, wherein transmitting, the DCI comprises:

transmitting, in response to determining that a Semi-Persistent Scheduling (SPS) Physical Downlink Shared CHannel (PDSCH) resource with a predetermined priority and the periodic measurement gap have an overlapping period in a time domain, the DCI prior to the overlapping period.

14. The method according to claim 12, further comprising:

keeping downlink communication with the user equipment during the overlapping period.

15. The method according to claim 10, further comprising at least one of:

transmitting second Radio Resource Control (RRC) signaling, wherein the second RRC signaling configures whether the user equipment is allowed to perform the inter-frequency signal measurement during the temporary measurement gap;

or transmitting third RRC signaling, wherein the third RRC signaling indicates a time length of the temporary measurement gap.

16. A communication device, comprising a processor, a transceiver, a memory and an executable program stored on the memory and executed by the processor, wherein the processor executes the executable program to implement operations of:

performing inter-frequency signal measurement during a temporary measurement gap, wherein the temporary measurement gap is different from a periodic measurement gap used for the inter-frequency signal measurement;

wherein performing the inter-frequency signal measurement during the temporary measurement gap comprises:

receiving Downlink Control Information (DCI); and performing, in response to determining that the DCI indicates triggering the temporary measurement gap, the inter-frequency signal measurement during the temporary measurement gap, wherein a start time point of the temporary measurement gap is later than a reception time point of the DCI, and an interval between the two time points is a first time length.

17. A communication device, comprising a processor, a transceiver, a memory and an executable program stored on the memory and executed by the processor, wherein the processor executes the executable program to implement steps of a channel measurement method of claim 10.

* * * * *